Nov. 29, 1955  K. H. SUEKER  2,725,518
VOLTAGE ERROR SENSING DEVICE
Filed Aug. 17, 1953  2 Sheets-Sheet 1

WITNESSES:
John E. Healy
K. H. Thomas

INVENTOR
Keith H. Sueker.
BY
Ezra W. Savage
ATTORNEY

Nov. 29, 1955  K. H. SUEKER  2,725,518
VOLTAGE ERROR SENSING DEVICE
Filed Aug. 17, 1953  2 Sheets-Sheet 2

WITNESSES:
John E. Hensly
K. H. Thomas

INVENTOR
Keith H. Seuker.
BY
Eyra W. Savage
ATTORNEY

United States Patent Office 2,725,518
Patented Nov. 29, 1955

2,725,518
VOLTAGE ERROR SENSING DEVICE

Keith H. Sueker, Pittsburgh, Pa., assignor to Westinghouse Electric Corporation, East Pittsburgh, Pa., a corporation of Pennsylvania Application August 17, 1953, Serial No. 374,555

14 Claims. (Cl. 322—24)

This invention relates to voltage error sensing devices and more particularly to regulator systems having voltage error sensing devices incorporated therein.

In order for a voltage error sensing device to be suitable for use in a regulator system, it should possess certain features. For instance, such a voltage error sensing device should be insensitive to changes in the frequency of its input voltage since a regulator system is only as accurate as the accuracy of the voltage error sensing device incorporated therein. In addition, the voltage error sensing device should have a minimum of power loss in order to minimize size, weight and heat dissipation.

An object of this invention is to provide a low power loss voltage error sensing device which is substantially insensitive to changes in the frequency of its input voltage over a wide range of frequency variation, by subtractively combining the output of an impedance network, having an output voltage which increases substantially linearly with changes in the frequency of its input voltage and which is substantially independent of the magnitude of its input voltage, with the output of another impedance network, the output voltage of which increases substantially linearly with changes in either the magnitude or frequency of its input voltage.

Another object of this invention is to provide an accurate regulator system, by incorporating therein a voltage error sensing device which is insensitive to changes in the frequency of its input voltage over a wide range of frequency variation.

Other objects of this invention will become apparent from the following description when taken in conjunction with the accompanying drawings, in which.

Figure 1:
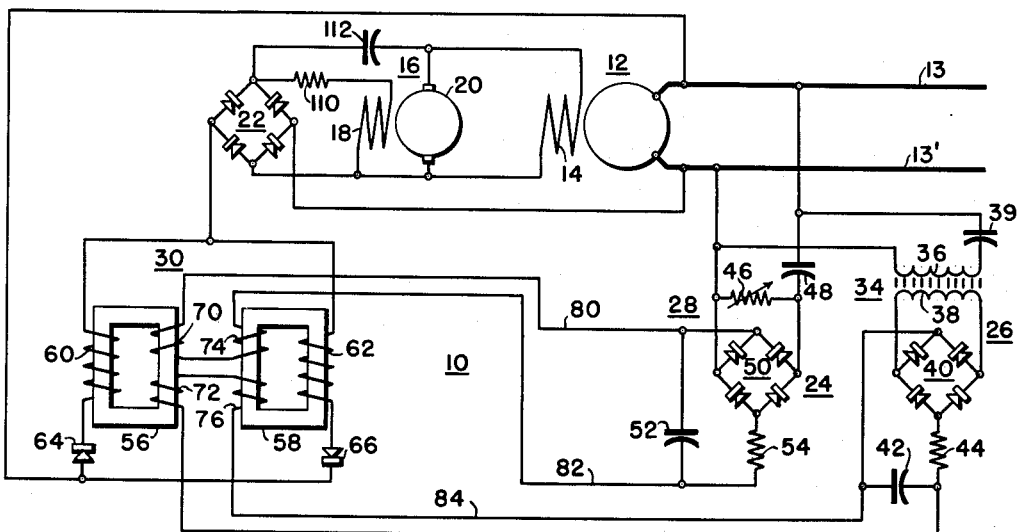
Figure 1 is a schematic diagram of a regulator system embodying a teaching of this invention.

Referring to Fig. 1 there is illustrated a regulator system 10 connected to maintain the output voltage of a single-phase alternating-current generator 12 substantially constant. As illustrated, the generator 12 is disposed to supply energy to load conductors 13 and 13′ in accordance with the magnitude of the voltage across the field winding 14 of the generator 12. In this instance, the magnitude of the voltage across the field winding 14 is controlled by an exciter 16 having a field winding 18 and an armature 20 which is connected across the field winding 14. In order to provide direct current for the field winding 18 of the exciter 16 the output terminals of a full-wave dry-type rectifier 22 are connected to the field winding 18.

Broadly, the regulator system 10 comprises a voltage error sensing device 24 which includes impedance networks 26 and 28 which are simultaneously responsive to the output voltage of the generator 12, the impedance network 26 having a direct-current output voltage which increases substantially linearly with changes in the frequency of the output voltage of the generator 12 and which is substantially independent of the magnitude of the output voltage of the generator 12, the impedance network 28 having a direct-current output voltage which increases substantially linearly with changes in either the magnitude of the output voltage of the generator 12 or with changes in the frequency of the output voltage of the generator 12. A saturable reactor, or more particularly a full-wave self-saturating magnetic amplifier 30, is responsive to the direct-current output voltages of the impedance networks 26 and 28. The amplifier 30 is disposed to supply energy to the rectifier 22 to thereby control the magnitude of the voltage across the field winding 14 of the generator 12 to thus maintain the output voltage of the generator 12 substantially constant.

Referring more particularly to the voltage error sensing device 24, the impedance network 26 comprises a saturating transformer 34 having a primary winding 36 and a secondary winding 38. A capacitor 39 is connected in series circuit relationship with the primary winding 36 of the transformer 34 in order to establish a ferro-resonant circuit and thus maintain a substantially constant output voltage across the secondary winding 38 for changes in the magnitude of the output voltage of the generator 12 providing the magnitude of the voltage across the primary winding 36 is at all times sufficient to substantially saturate the core of the transformer 34.

As illustrated, this series circuit, including the primary winding 36 and the capacitor 39 is connected to be responsive to the output voltage of the generator 12. Of course, it is to be understood that a ferro-resonant circuit could be established by connecting a capacitor (not shown) in parallel circuit relationship with the primary winding 36 instead of in series circuit relationship as illustrated, the parallel circuit (not shown) then being responsive to the output voltage of the generator 12. However, when the capacitor (not shown) is connected in parallel with the primary winding 36 some type of current limiting means must be provided for the primary winding 36.

In order to obtain a direct-current output voltage from the impedance network 26 a full-wave dry-type rectifier 40 is provided. In particular, the input terminals of the rectifier 40 are connected to the secondary winding 38 of the transformer 34. On the other hand, in order to filter the output from the rectifier 40, a filter network comprising a capacitor 42 and a resistor 44 is provided. The function of this filter network, including the capacitor 42 and the resistor 44, will be described hereinafter.

As illustrated, the impedance network 28 comprises an RC network including a variable resistor 46 and a capacitor 48, which are connected in series circuit relationship with one another, the series circuit being responsive to the output voltage of the generator 12. In order to obtain proper results the impedance of the capacitor 48 should be large compared to the impedance of the resistor 46. For the purpose of obtaining a direct-current output voltage for the impedance network 28, a full-wave dry-type rectifier 50 is provided, the resistor 46 being connected to the input terminals of the rectifier 50. A filter network, including a capacitor 52 and a resistor 54 is connected to the output of the rectifier 50. The function of this filter network will be described hereinafter.

As illustrated, the magnetic amplifier 30 comprises in this instance two rectangular core members 56 and 58 constructed of magnetic core material. Premagnetization of the core members 56 and 58 is obtained by disposing in inductive relationship therewith load windings 60 and 62, respectively. On the other hand, self-saturation of the magnetic amplifier 30 is obtained by connecting self-saturating rectifiers 64 and 66 in series circuit relationship with the load windings 60 and 62, respectively. Circuit means is provided for connecting the series connected load winding 60 and rectifier 64 in parallel circuit relationship with the series connected load winding 62 and rectifier 66, and for interconnecting the load windings 60 and 62 with the output of the generator 12 and with the field winding 14 of the generator 12 so that energy is supplied to the load windings 60 and 62 and so that the field winding 14 is responsive to the magnitude of the current flow through the load windings 60 and 62. In particular, the load conductor 13 is connected to the junction point of the self-saturating rectifiers 64 and 66, while the junction point of the load windings 60 and 62 is connected to one of the input terminals of the rectifier 22. In order to complete the energizing circuit for the load windings 60 and 62, the other input terminal of the rectifier 22 is connected to the load conductor 13'.

Control windings 70 and 72 are disposed in inductive relationship with the core member 56 and control windings 74 and 76 are disposed in inductive relationship with the core member 58. In order to render the control windings 70 and 74 responsive to the direct-current output voltage of the impedance network 28, the control windings 70 and 74 are connected in series circuit relationship with one another, the series circuit being connected across the capacitor 52 by means of conductors 80 and 82. On the other hand, in order to render the control windings 72 and 76 responsive to the direct-current output voltage of the impedance network 26, the control windings 72 and 76 are connected in series circuit relationship with one another, the series circuit being connected across the capacitor 42 by means of conductors 84 and 86. As illustrated, the control winding 70 is so disposed that current flow therethrough produces a flux in the core member 56 that opposes the flux produced by the current flow through the control winding 72. Likewise, the control winding 74 is so disposed that current flow therethrough produces a flux in the core member 58 that opposes the flux produced by the current flow through the control winding 76. Thus, when the output voltage of the generator 12 is at its regulated value, the flux produced by the current flow through the control windings 70 and 74 is offset by the flux produced by the current flow through the control windings 72 and 76.

It is to be noted that in the embodiment illustrated in Fig. 1 the direct-current output voltage of the impedance network 26 is subtractively combined with the direct-current output voltage of the impedance network 28 in the magnetic amplifier 30 so that at the regulated output voltage of the generator 12 the effect produced by the direct-current output voltage of the impedance network 26 is offset or cancelled by the effect produced by the direct-current output voltage of the impedance network 28. Since this combining of the output voltages of the impedance networks 26 and 28 takes place within the amplifier 30, the control windings 70, 72, 74 and 76 and the core members 56 and 58 of the magnetic amplifier 30 also constitute a part of the voltage error sensing device 24.

Figure 2:
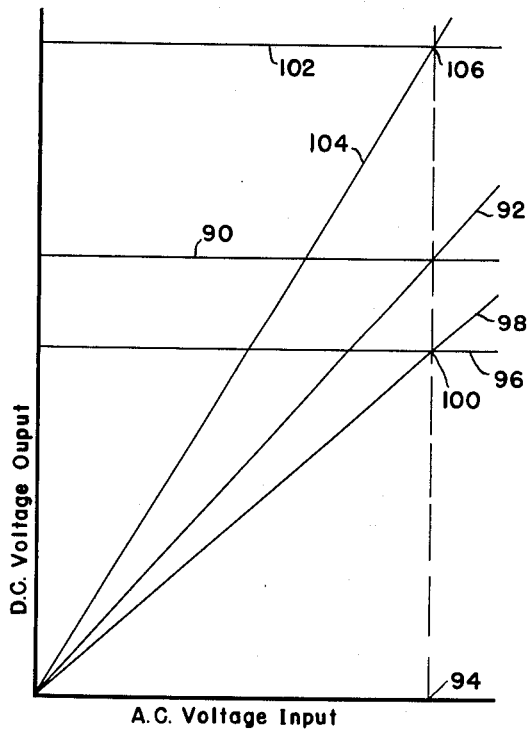
Fig. 2 is a graph illustrating the reason why the voltage error sensing devices illustrated in Figs. 1 and 3 through 5 are substantially insensitive to the frequency of their input voltage.

By subtractively combining the direct-current output voltages of the impedance networks 26 and 28, the voltage error sensing device 24 is rendered substantially insensitive to changes in the frequency of the output voltage of the generator 12 and thus substantially insensitive to changes in the frequency of its input voltage. The reason the voltage error sensing device 24 is substantially insensitive to changes in the frequency of its input voltage can be better understood by referring to Fig. 2. In Fig. 2, a curve 90 illustrates how the direct-current output voltage of the impedance network 26 does not vary with changes in the magnitude of the input voltage to the impedance network 26. On the other hand, a curve 92 represents the manner in which the direct-current output voltage of the impedance network 28 varies with changes in the magnitude of the input voltage to the impedance network 28. It can be seen that at a given input voltage to the impedance networks 26 and 28, as represented at 94, the direct-current output voltage of the impedance network 26 is equal to the direct-current output voltage of the impedance network 28. When this condition exists, the output voltage of the generator 12 is at its regulated value. However, assume the frequency of the output voltage of the generator 12 and thus the frequency of the input voltage to the impedance networks 26 and 28 decreases, then the curve 90 assumes a lower position as illustrated by a curve 96. With the input voltage to the impedance networks 26 and 28 at this decreased frequency, the curve 92 likewise assumes a new position, as illustrated by a curve 98. It is to be noted that the curves 96 and 98 intersect at the same magnitude of input voltage to the voltage error sensing device 24 as do the curves 90 and 92. Therefore, since the curves 96 and 98, representing a lower frequency for the input voltage to the impedance networks 26 and 28, intersect at the same magnitude of input voltage to the impedance networks 26 and 28 and since at this intersection point, as illustrated at 100, the direct-current output voltages of the impedance networks 26 and 28 are of equal magnitude, the change in the frequency of the input voltage to the voltage error sensing device 24 has not effected the magnitude of the output voltage of the voltage error sensing device when the output voltage of the generator 12 is at its regulated value.

With an increase in the frequency of the input voltage to the voltage error sensing device 24, the curve 90 assumes a position as illustrated by a curve 102 and the curve 92 assumes a position as illustrated by a curve 104. Here again, the curves 102 and 104 intersect at a point 106 having the same value of input voltage to the impedance networks 26 and 28 as does the intersecting point 100.

The operation of the apparatus illustrated in Fig. 1 will now be described. Assuming the output voltage of the generator 12 increases to a value above its regulated value, then as illustrated in Fig. 2, the output voltage of the impedance network 28 becomes greater than the output voltage of the impedance network 26. When this condition exists, the current flow through the control windings 70 and 74 of the amplifier 30 is greater in magnitude than the current flow through the control windings 72 and 76. Therefore, the resultant flux produced by the current flow through the control windings 70 and 72 opposes the flux produced by the current flow through the load winding 60 and the resultant flux produced by the current flow through the control windings 74 and 76 also opposes the flux produced by the current flow through the load winding 62. Thus, the impedance of the load windings 60 and 62 is increased to thereby decrease the current flow through the load windings 60 and 62. With a decrease in the current flow through the load windings 60 and 62 the magnitude of the current flow through the field winding 18 of the exciter 16 is decreased to thereby decrease the current flow through the field winding 14 of the generator 12 to thereby return the output voltage of the generator 12 to its regulated value. During this operation energization of the field winding 18 of the exciter 16 is established by an energizing circuit which extends, during one-half cycle of the alternating-current output voltage of the generator 12, from the load conductor 13, through the rectifier 64 of the amplifier 30, the load winding 60, the rectifier 22, a resistor 110, the function of which will be described hereinafter, the field winding 18, and the rectifier 22 to the load conductor 13'. During the next half-cycle of the alternating-current output voltage of the generator 12, the energizing circuit for the field winding 18 of the exciter 16 extends from the load conductor 13' through the rectifier 22, the resistor 110, the field winding 18, the rectifier 22, the load winding 62 of the amplifier 30, and the rectifier 66 to the load conductor 13.

On the other hand, with a decrease in the output voltage of the generator 12 to a value below its regulated value, the output voltage of the impedance network 26 is of greater magnitude than the direct-current output voltage of the impedance network 28. Under such a condition, the flux produced in the core members 56 and 58 by the control windings 72 and 76, respectively, is greater in magnitude than the flux produced in the core members 56 and 58 by the current flow through the control windings 70 and 74, respectively. Therefore, the resultant flux produced by the current flow through the control windings 70 and 72 is in the same direction as the flux produced by the current flow through the load winding 60 and the resultant flux produced by the control windings 74 and 76 is also in the same direction as the flux produced by the current flow through the load winding 62. Such a condition decreases the impedance of the load windings 60 and 62 to thereby increase the current flow through the load windings 60 and 62 and thus the current flow through the field winding 18 of the exciter 16 to thereby return the output voltage of the generator 12 to its regulated value.

The operation of the regulator system 10 is improved by providing the filter network including the capacitor 42 and the resistor 44 and by providing the filter network including the capacitor 52 and the resistor 54. In particular, by reducing the ripple in the outputs of the impedance networks 26 and 28, the stability of the regulator system 10 is increased. However, in practice it has been found that the stability of the regulator system 10 is further increased by providing a stabilizing network including the resistor 110 and a capacitor 112, the capacitor 112 being connected between one of the output terminals of the rectifier 22 and one side of the armature 20 of the exciter 16.

Figure 3:
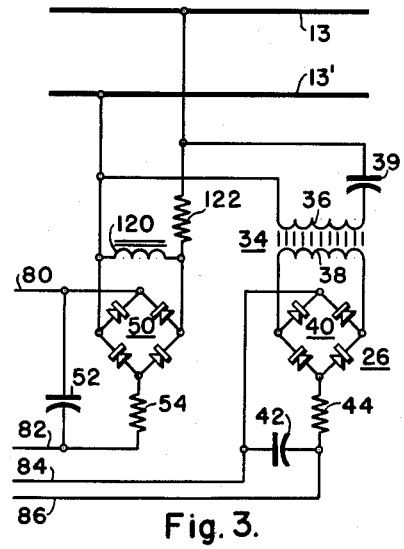
Fig. 3 is a schematic diagram of another embodiment of this invention illustrating a voltage error sensing device that can be substituted for the voltage error sensing device shown in Fig. 1.

Referring to Fig. 3, there is illustrated another embodiment of this invention in which like components of Figs. 1 and 3 have been given the same reference characters. The main distinction between the apparatus illustrated in Figs. 1 and 3 is that in the apparatus of Fig. 3 an RL network comprising an inductance member 120 and a resistor 122 has been substituted for the RC network, illustrated in Fig. 1, and comprising the resistor 46 and the capacitor 48. As was the case with the rectifier 50 illustrated in Fig. 1, the direct-current output voltage of the rectifier 50 illustrated in Fig. 3 increases substantially linearly with changes in the magnitude of the output voltage of the generator 12 and with changes in the frequency of the output voltage of the generator 12. However, since substantially all the voltage drop occurs across the capacitor 48 instead of across the resistor 46, in the apparatus illustrated in Fig. 1, the power loss of the voltage error sensing network 24, illustrated in Fig. 1, is kept to a low value. When utilizing the RL network including the inductance member 120 and the resistor 122, as illustrated in Fig. 3, substantially all the voltage drop appears across the resistor 122, and therefore, the voltage error sensing device illustrated in Fig. 3 which is substantially insensitive to changes in the frequency of its input voltage, has a higher power loss than does the voltage error sensing device 24 illustrated in Fig. 1. Since the remainder of the apparatus not illustrated in Fig. 3 is the same as that apparatus illustrated in Fig. 1, a further description of the apparatus illustrated in Fig. 3 is deemed unnecessary.

Figure 4:
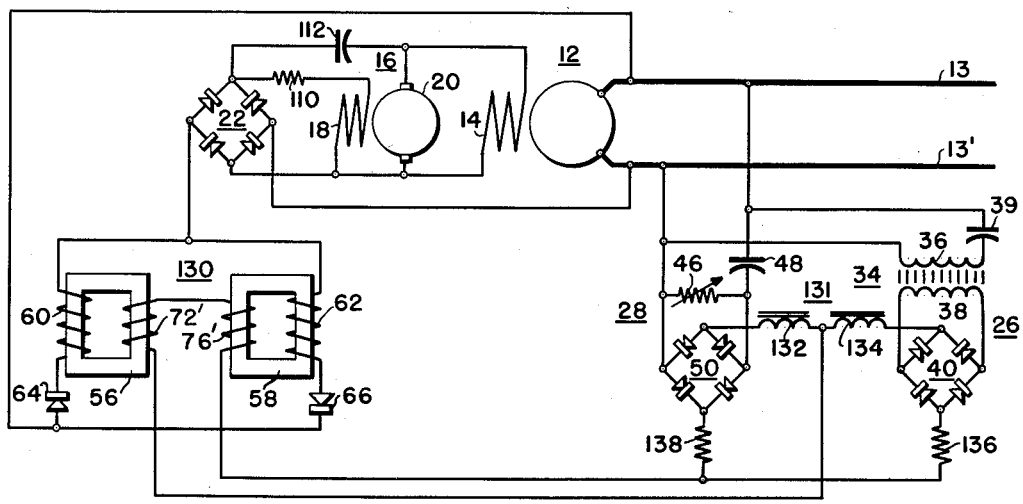
Fig. 4 is a schematic diagram of a regulator system embodying another teaching of this invention.

Referring to Fig. 4, there is illustrated another embodiment of this invention in which like components of Figs. 1 and 4 have been given the same reference characters. The main distinction between the apparatus illustrated in Figs. 1 and 4 is that in the apparatus of Fig. 4 circuit means is provided for subtractively combining the direct-current output voltages of the impedance networks 26 and 28 before they are applied to a full-wave self-saturating magnetic amplifier 130, to thereby render the voltage error sensing device 131 substantially insensitive to changes in the frequency of its input voltage. In particular, smoothing reactors 132 and 134 are connected in series circuit relationship with one another, one end of the series circuit being connected to one of the output terminals of the rectifier 50 and the other end of the series circuit being connected to one of the output terminals of the rectifier 40. In order to insure that the voltages of the rectifiers 40 and 50 remain positive for a predetermined change in the output voltage of the generator 12, a resistor 136 is associated with the rectifier 40, and a resistor 138 is associated with the rectifier 50, the resistors 136 and 138 being connected in series circuit relationship with one another, one end of the series circuit being connected to the other output terminal of the rectifier 50 and the other end of the series circuit being connected to the other output terminal of the rectifier 40.

In the apparatus illustrated in Fig. 4, the control windings 72' and 76' are responsive to the difference in the direct-current output voltages of the impedance networks 26 and 28. In particular, the control windings 72' and 76' are connected in series circuit relationship with one another, one end of the series circuit being connected to the junction point of the smoothing reactors 132 and 134 and the other end of the series circuit being connected to the junction point of the resistors 136 and 138.

The operation of the apparatus illustrated in Fig. 4 will now be described. As can be seen from Fig. 2, with an increase in the output voltage of the generator 12 to a value above its regulated value, the direct-current output voltage of the impedance network 28 increases to a value above the direct-current output voltage of the impedance network 26, to thereby increase the output current from the rectifier 50. When the output current from the rectifier 50 is of greater magnitude than the output current from the rectifier 40, current flows in such a direction through the control windings 72' and 76' of the magnetic amplifier 130 as to produce a flux in the core members 56 and 58, respectively, which opposes the flux produced by the current flow through the load windings 60 and 62, respectively, to thereby increase the impedance of the load windings 60 and 62. An increase in the impedance of the load windings 60 and 62 effects a decrease in the magnitude of the current flow therethrough and thus a decrease in the magnitude of the current flow through the field winding 18 of the exciter 16. A decrease in the current flow through the field winding 18 of the exciter 16 in turn decreases the current flow through the field winding 14 of the generator 12 to thereby return the output voltage of the generator 12 to its regulated value.

On the other hand, with a decrease in the output voltage of the generator 12 to a value below its regulated value, the direct-current output voltage of the impedance network 28 decreases to a value below the direct-current output voltage of the impedance network 26 to thereby render the output current of the rectifier 40 of greater magnitude than the output current of the rectifier 50. When this condition exists, current flows in such a direction through the control windings 72' and 76' of the magnetic amplifier 130 as to effect a flux in the cores 56 and 58, respectively, which is additive to the flux produced in these core members by their respective load windings 60 and 62, to thus decrease the impedance of the load windings 60 and 62. A decrease in the impedance of the load windings 60 and 62 effects an increase in the current flow therethrough and an increase in the current flow through the field winding 18 of the exciter 16. An increase in the current flow through the field winding 18 of the exciter 16 increases the current flow through the field winding 14 of the generator 12 to thereby return the output voltage of the generator 12 to its regulated value.

Figure 5:
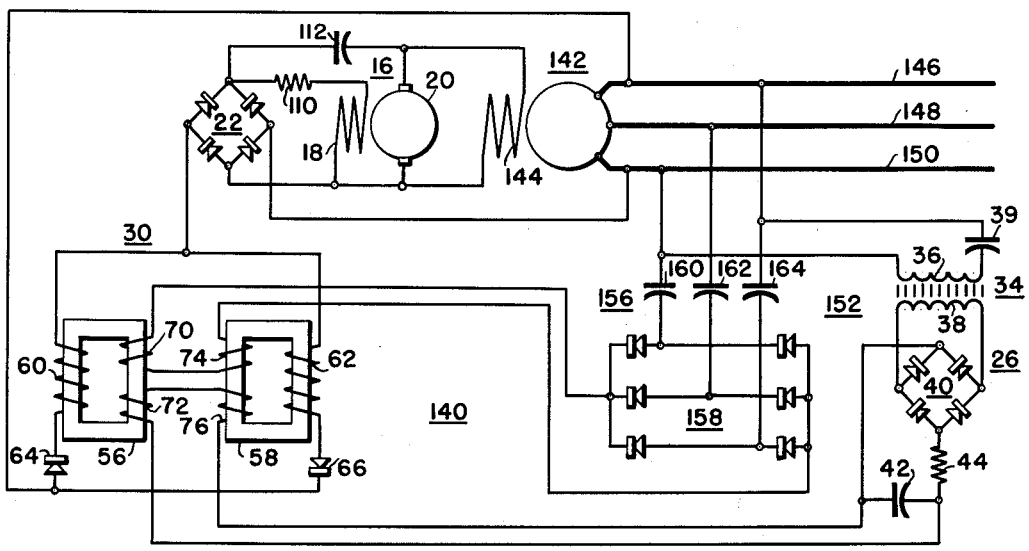
Fig. 5 is a schematic diagram of another regulator system having incorporated therein a three-phase voltage error sensing device embodying a teaching of this invention.

Referring to Fig. 5 there is illustrated another embodiment of this invention in which like components of Figs. 1 and 5 have been given the same reference characters. In Fig. 5 there is illustrated a regulator system 140 for maintaining the average output voltage of a three-phase alternating-current generator 142, having a field winding 144, substantially constant. As illustrated, the generator 142 is disposed to supply energy to load conductors 146, 148 and 150. In general, the regulator system 140 comprises a voltage error sensing device 152 responsive to the output voltage of the generator 142 and the magnetic amplifier 30 responsive to the voltage error sensing device 152 for controlling the magnitude of the voltage across the field winding 144 of the generator 142 to thereby maintain its average output voltage substantially constant. As was the case with the previously described voltage error sensing devices illustrated in Figs. 1, 3 and 4, the voltage error sensing device 152 is substantially insensitive to changes in the frequency of its input voltage.

In order to reduce the amount of filtering required for the voltage error sensing device 152, an impedance network 156 responsive to the three-phase output voltage of the generator 142 is provided. As illustrated, the impedance network 156 comprises a three-phase rectifier 158 and capacitive means, including capacitors 160, 162 and 164, for connecting the input of the rectifier 158 to the three-phase output of the generator 142. As was the case with the impedance network 28 illustrated in Fig. 1, the direct-current output voltage of the impedance network 156 increases substantially linearly with changes in the magnitude of the output voltage of the generator 142 and with changes in the frequency of the output voltage of the generator 142 as long as the impedances of the capacitors 160, 162 and 164 are large as compared to the impedances of the control windings 70 and 74 and the associated rectifier 158. However, since three-phase ripple is produced at the output of the rectifier 158, which ripple is not detrimental to the operation of the regulator system 140, it is not necessary to provide filter means at the output of the impedance network 156.

Since the operation of the apparatus illustrated in Fig. 5 is substantially identical to the operation of the apparatus illustrated in Fig. 1, a description of the operation of the apparatus illustrated in Fig. 5 is deemed unnecessary.

It is to be understood that although a specific type of magnetic amplifier has been illustrated in the various figures of the drawings, other types of saturable reactors or magnetic amplifiers could be substituted for the specific magnetic amplifiers illustrated.

The apparatus embodying the teachings of this invention has several advantages. For instance, the various voltage error sensing devices illustrated have a low power loss. In addition, since the voltage error sensing devices illustrated in the accompanying drawings are substantially insensitive to changes in the frequency of their input voltage, they are accurate and so are the various regulator systems which have these voltage error sensing devices incorporated therein. It is also to be noted that the regulator systems illustrated herein comprise static components and thus require a minimum amount of maintenance and replacement of component parts.

Since numerous changes may be made in the above described apparatus and circuits and different embodiments of the invention may be made without departing from the spirit and scope thereof, it is to be understood that all the matter contained in the forgoing description or shown in the accompanying drawings shall be interpreted as illustrative and not in a limiting sense.

I claim as my invention:

1. In a static voltage error sensing device responsive to an alternating-current voltage and substantially insensitive to the frequency of said alternating-current voltage over a wide range of frequency variation, the combination comprising, an impedance network responsive to said alternating-current voltage and having an output voltage which increases substantially linearly with changes in the frequency of said alternating-current voltage and which is substantially independent of the magnitude of said alternating-current voltage, another impedance network responsive to said alternating-current voltage and having an output voltage which increases substantially linearly with changes in the magnitude of said alternating-current voltage and with changes in the frequency of said alternating-current voltage, and means responsive to the output voltages of said impedance network and said another impedance network for subtractively combining the output voltage of said impedance network and the output voltage of said another impedance network so that at a given magnitude of said alternating-current voltage the effect produced by the output voltage of said impedance network is offset by the effect produced by the output voltage of said another impedance network.

2. In a voltage error sensing device responsive to an alternating-current voltage and substantially insensitive to the frequency of said alternating-current voltage over a wide range of frequency variation, the combination comprising, an impedance network including a saturating transformer responsive to said alternating current voltage and a rectifier responsive to the output of the saturating transformer, for producing a direct-current output voltage for the impedance network that increases substantially linearly with changes in the frequency of said alternating-current voltage and that is substantially independent of the magnitude of said alternating-current voltage, another impedance network responsive to said alternating-current voltage for producing a direct-current output voltage for said another impedance network which increases substantially linearly with changes in the magnitude of said alternating-current voltage and with changes in the frequency of said alternating-current voltage, and means responsive to the output voltages of said impedance network and said another impedance network for subtractively combining the direct-current output voltage of said impedance network and the direct-current output voltage of said another impedance network so that at a given magnitude of said alternating-current voltage the effect produced by the direct-current output voltage of said impedance network is offset by the effect produced by the direct-current output voltage of said another impedance network.

3. In a voltage error sensing device responsive to an alternating-current voltage and substantially insensitive to the frequency of said alternating-current voltage over a wide range of frequency variation, the combination comprising, an impedance network including a saturating transformer responsive to said alternating-current voltage and a rectifier responsive to the output of the saturating transformer, for producing a direct-current output voltage for the impedance network that increases substantially linearly with changes in the frequency of said alternating-current voltage and that is substantially independent of the magnitude of said alternating-current voltage, another impedance network including a resistor and a capacitor connected in series circuit relationship with one another, the series circuit being responsive to said alternating-current voltage, and another rectifier, the input of said another rectifier being connected to said resistor for producing a direct-current output voltage for said another impedance network which increases substantially linearly with changes in the magnitude of said alternating-current voltage and with changes in the frequency of said alternating-current voltage, and means connected to the output of said rectifier and to the output of said another rectifier for subtractively combining the direct-current output voltage of said impedance network and the direct-current output voltage of said another impedance network, so that at a given magnitude of said alternating-current voltage the effect produced by the direct-current output voltage of said impedance network is offset by the effect produced by the direct-current output voltage of said another impedance network.

4. In a voltage error sensing device responsive to an alternating-current voltage and substantially insensitive to the frequency of said alternating-current voltage over a wide range of frequency variation, the combination comprising, an impedance network including a saturating transformer responsive to said alternating-current voltage and a rectifier responsive to the output of the saturating transformer, for producing a direct-current output voltage for the impedance network that increases substantially linearly with changes in the frequency of said alternating-current voltage and that is substantially independent of the magnitude of said alternating-current voltage, another impedance network including a resistor and an inductance member connected in series circuit relationship with one another, the series circuit being responsive to said alternating-current voltage, and another rectifier, the input of said another rectifier being connected to said inductance member for producing a direct-current output voltage for said another impedance network which increases substantially linearly with changes in the magnitude of said alternating-current voltage and with changes in the frequency of said alternating-current voltage, and means connected to the output of said rectifier and to the output of said another rectifier for subtractively combining the direct-current output voltage of said impedance network and the direct-current output voltage of said another impedance network so that at a given magnitude of said alternating-current voltage the effect produced by the direct-current output voltage of said impedance network is offset by the effect produced by the direct-current output voltage of said another impedance network.

5. In a voltage error sensing device responsive to an alternating-current voltage and substantially insensitive to the frequency of said alternating-current voltage over a wide range of frequency variation, the combination comprising, an impedance network including a saturating transformer having a primary winding and a secondary winding, the primary winding having a capacitor connected in series circuit relationship therewith to establish a ferro-resonant circuit, the series circuit being responsive to said alternating-current voltage, and a rectifier, the input of the rectifier being connected to the secondary winding for producing a direct-current output voltage for the impedance network that increases substantially linearly with changes in the frequency of said alternating-current voltage and that is substantially independent of the magnitude of said alternating-current voltage, another impedance network including a resistor and another capacitor connected in series circuit relationship with one another, the series circuit, including said resistor and said another capacitor, being responsive to said alternating-current voltage, and the impedance of said another capacitor being high compared to the impedance of said resistor, and another rectifier, the input of said another rectifier being connected to said resistor for producing a direct-current output voltage for said another impedance network which increases substantially linearly with changes in the magnitude of said alternating-current voltage and with changes in the frequency of said alternating-current voltage, and means connected to the output of said rectifier and to the output of said another rectifier for subtractively combining the direct-current output voltage of said impedance network and the direct-current output voltage of said another impedance network so that at a given magnitude of said alternating-current voltage the effect produced by the direct-current output voltage of said impedance network is offset by the effect produced by the direct-current output voltage of said another impedance network.

6. In a regulator system for maintaining the output voltage of an alternating-current generator, having a field winding, substantially constant, the combination comprising, an impedance network responsive to the output voltage of the generator for producing a direct-current output voltage which increases substantially linearly with changes in the frequency of the output voltage of the generator and which is substantially independent of the magnitude of the output voltage of the generator, another impedance network responsive to the output voltage of the generator for producing a direct-current output voltage which increases substantially linearly with changes in the magnitude of the output voltage of the generator and with changes in the frequency of the output voltage of the generator, a saturable reactor having magnetic core means, a load winding disposed in inductive relationship with the magnetic core means, and two opposing control windings disposed in inductive relationship with the magnetic core means, one of said control windings being responsive to the direct-current output voltage of said impedance network and the other of said control windings being responsive to the direct-current output voltage of said another impedance network, and circuit means for supplying energy to said load winding and for interconnecting said load winding with the field winding of the generator so that said field winding is responsive to the magnitude of the current flow through said load winding.

7. In a regulator system for maintaining the output voltage of an alternating-current generator, having a field winding, substantially constant, the combination comprising, an impedance network including a saturating transformer responsive to the output voltage of the generator and a rectifier responsive to the output of the saturating transformer, for producing a direct-current output voltage for the impedance network that increases substantially linearly with changes in the frequency of the output voltage of the generator and that is substantially independent of the magnitude of the output voltage of the generator, another impedance network responsive to the output voltage of the generator for producing a direct-current output voltage for said another impedance network which increases substantially linearly with changes in the magnitude of the output voltage of the generator and with changes in the frequency of the output voltage of the generator, a saturable reactor having magnetic core means, a load winding disposed in inductive relationship with the magnetic core means, and two opposing control windings disposed in inductive relationship with the magnetic core means, one of said control windings being responsive to the direct-current output voltage of said impedance network and the other of said control windings being responsive to the direct-current output voltage of said another impedance network, and circuit means for supplying energy to said load winding and for interconnecting said load winding with the field winding of the generator so that said field winding is responsive to the magnitude of the current flow through said load winding.

8. In a regulator system for maintaining the output voltage of an alternating-current generator, having a field winding, substantially constant, the combination comprising, an impedance network including a saturating transformer responsive to the output voltage of the generator and a rectifier responsive to the output of the saturating transformer, for producing a direct-current output voltage for the impedance network that increases substantially linearly with changes in the frequency of the output voltage of the generator and that is substantially independent of the magnitude of the output voltage of the generator, another impedance network including a resistor and a capacitor connected in series relationship with one another, the series circuit being responsive to the output voltage of the generator, and another rectifier, the input of said another rectifier being connected to said resistor for producing a direct-current output voltage for said another impedance network which increases substantially linearly with changes in the magnitude of the output voltage of the generator and with changes in the frequency of the output voltage of the generator, a magnetic amplifier having magnetic core means, two load windings disposed in inductive relationship with the magnetic core means, each of said load windings having a self-saturating rectifier connected in series circuit relationship therewith, and two opposing control windings disposed in inductive relationship with the magnetic core means, one of said control windings being responsive to the direct-current output voltage of said impedance network and the other of said control windings being responsive to the direct-current output voltage of said another impedance network, and circuit means for connecting said series circuit comprising one of said load windings and its associated self-saturating rectifier in parallel circuit relationship with said series circuit comprising the other of said two load windings and its associated self-saturating rectifier and for interconnecting said parallel circuit with the field winding of the generator and with the output of the generator so that said field winding is responsive to the magnitude of the current flow through said two load windings.

9. In a regulator system for maintaining the output voltage of an alternating-current generator, having a field winding, substantially constant, the combination comprising, an impedance network including a saturating transformer responsive to the output voltage of the generator and a rectifier responsive to the output of the saturating transformer, for producing a direct-current output voltage for the impedance network that increases substantially linearly with changes in the frequency of the output voltage of the generator and that is substantially independent of the magnitude of the output voltage of the generator, another impedance network including a resistor and an inductance member connected in series circuit relationship with one another, the series circuit being responsive to the output voltage of the generator, and another rectifier, the input of said another rectifier being connected to said inductance member for producing a direct-current output voltage for said another impedance network which increases substantially linearly with changes in the magnitude of the output voltage of the generator and with changes in the frequency of the output voltage of the generator, a magnetic amplifier having magnetic core means, two load windings disposed in inductive relationship with the magnetic core means, each of said load windings having a self-saturating rectifier connected in series circuit relationship therewith, and two opposing control windings disposed in inductive relationship with the magnetic core means, one of said control windings being responsive to the direct-current output voltage of said impedance network and the other of said control windings being responsive to the direct-current output voltage of said another impedance network, and circuit means for connecting said series circuit comprising one of said load windings and its associated self-saturating rectifier in parallel circuit relationship with said series circuit comprising the other of said two load windings and its associated self-saturating rectifier and for interconnecting said parallel circuit with the field winding of the generator and with the output of the generator so that said field winding is responsive to the magnitude of the current flow through said two load windings.

10. In a regulator system for maintaining the output voltage of an alternating-current generator, having a field winding, substantially constant, the combination comprising, an impedance network including a saturating transformer having a primary winding and a secondary winding, the primary winding having a capacitor connected in series circuit relationship therewith to establish a ferro-resonant circuit, the series circuit being responsive to the output voltage of the generator, and a rectifier, the input of the rectifier being connected to said secondary winding for producing a direct-current output voltage for the impedance network that increases substantially linearly with changes in the frequency of the output voltage of the generator and that is substantially independent of the magnitude of the output voltage of the generator, another impedance network including a resistor and another capacitor connected in series circuit relationship with one another, the series circuit, including said resistor and said another capacitor, being responsive to the output voltage of the generator and the impedance of said another capacitor being high compared to the impedance of said resistor, and another rectifier, the input of said another rectifier being connected to said resistor for producing a direct-current output voltage for said another impedance network which increases substantially linearly with changes in the magnitude of the output voltage of the generator and with changes in the frequency of the output voltage of the generator, a filter connected to the output of said rectifier, another filter connected to the output of said another rectifier, a magnetic amplifier having magnetic core means, two load windings disposed in inductive relationship with the magnetic core means, each of said load windings having a self-saturating rectifier connected in series circuit relationship therewith, and two opposing control windings disposed in inductive relationship with the magnetic core means, one of said control windings being connected to the output of said filter, and the other of said control windings being connected to the output of said another filter, and circuit means for connecting said series circuit comprising one of said load windings and its associated self-saturating rectifier in parallel circuit relationship with said series circuit comprising the other of said two loading windings and its associated self-saturating rectifier and for interconnecting said parallel circuit with the field winding of the generator and with the output of the generator so that said field winding is responsive to the magnitude of the current flow through said two load windings.

11. In a regulator system for maintaining the output voltage of an alternating-current generator, having a field winding, substantially constant, the combination comprising, an impedance network responsive to the output voltage of the generator for producing a direct-current output voltage which increases substantially linearly with changes in the frequency of the output voltage of the generator, and which is substantially independent of the magnitude of the output voltage of the generator, another impedance network responsive to the output voltage of the generator for producing a direct-current output voltage which increases substantially linearly with changes in the magnitude of the output voltage of the generator and with changes in the frequency of the output voltage of the generator, a saturable reactor having magnetic core means, a load winding disposed in inductive relationship with the magnetic core means, a control winding disposed in inductive relationship with the magnetic core means, circuit means for rendering said control winding responsive to the difference in the direct-current output voltages of said impedance network and said another impedance network, and other circuit means for supplying energy to said load winding and for interconnecting said load winding with the field winding of the generator so that said field winding is responsive to the magnitude of the current flow through said load winding.

12. In a regulator system for maintaining the output voltage of an alternating-current generator, having a field winding, substantially constant, the combination comprising, an impedance network including a saturating transformer responsive to the output voltage of the generator and a rectifier responsive to the output of the saturating transformer, for producing a direct-current output voltage for the impedance network that increases substantially linearly with changes in the frequency of the output voltage of the generator and that is substantially independent of the magnitude of the output voltage of the generator, another impedance network including a resistor and a capacitor connected in series circuit relationship with one another, the series circuit being responsive to the output voltage of the generator, another rectifier, the input of said another rectifier being connected to said resistor for producing a direct-current output voltage for said another impedance network which increases substantially linearly with changes in the magnitude of the output voltage of the generator and with changes in the frequency of the output voltage of the generator, a saturable reactor having magnetic core means, a load winding disposed in inductive relationship with the magnetic core means, and a control winding disposed in inductive relationship with the magnetic core means, circuit means for rendering said control winding responsive to the difference in the direct-current output voltages of said impedance network and said another impedance network, and other circuit means for supplying energy to said load winding and for interconnecting said load winding with the field winding of the generator so that said field winding is responsive to the magnitude of the current flow through said load winding.

13. In a regulator system for maintaining the output voltage of a three-phase alternating current generator, having a field winding, substantially constant, the combination comprising, an impedance network including a three-phase rectifier and capacitive means for interconnecting the input of said rectifier to the output of said generator so that a direct-current output voltage is produced for said impedance network which increases substantially linearly with changes in the magnitude of the output voltage of the generator and with changes in the frequency of the output voltage of the generator, another impedance network including a saturating transformer responsive to one phase of the output voltage of the generator and a single-phase rectifier responsive to the output of the saturating transformer, for producing a direct-current output voltage for said another impedance network that increases substantially linearly with changes in the frequency of the output voltage of the generator and that is substantially independent of the magnitude of the output voltage of the generator, a saturable reactor having magnetic core means, a load winding disposed in inductive relationship with the magnetic core means, and two opposing control windings disposed in inductive relationship with the magnetic core means, one of said control windings being responsive to the direct-current output voltage of said impedance network and the other of said control windings being responsive to the direct-current output voltage of said another impedance network, and circuit means for supplying energy to said load winding and for interconnecting said load winding with the field winding of the generator so that said field winding is responsive to the magnitude of the current flow through said load winding.

14. In a regulator system for maintaining the output voltage of a three-phase alternating-current generator, having a field winding, substantially constant, the combination comprising, an impedance network including a three-phase rectifier and capacitive means for connecting the input of said rectifier to the output of said generator so that a direct-current voltage is produced at the output of said rectifier which increases substantially linearly with changes in the magnitude of the output voltage of the generator and with changes in the frequency of the output voltage of the generator, another impedance network including a saturating transformer having a primary winding and a secondary winding, a capacitor connected in series circuit relationship with said primary winding to establish a ferro-resonant circuit, the series circuit being responsive to one phase of the output voltage of the generator, a single-phase rectifier, the input terminals of the single-phase rectifier being connected to said secondary winding, and a filter connected to the output terminals of the single-phase rectifier, the output voltage of said filter being such that it increases substantially linearly with changes in the frequency of the output voltage of the generator and remains substantially constant with changes in the magnitude of the output voltage of said generator, a saturable reactor having magnetic core means, a load winding disposed in inductive relationship with the magnetic core means and two opposing control windings disposed in inductive relationship with the magnetic core means, one of said control windings being connected to the output of said three-phase rectifier and the other of said control windings being connected to the output of said filter, and circuit means for supplying energy to said load winding and for interconnecting said load winding with the field winding of the generator so that said field winding is responsive to the magnitude of the current flow through said load winding.

No references cited.